Nov. 27, 1934.  W. M. VENABLE  1,982,127
APPARATUS FOR MEASURING BULK MATERIALS
Filed Nov. 27, 1931  4 Sheets-Sheet 4

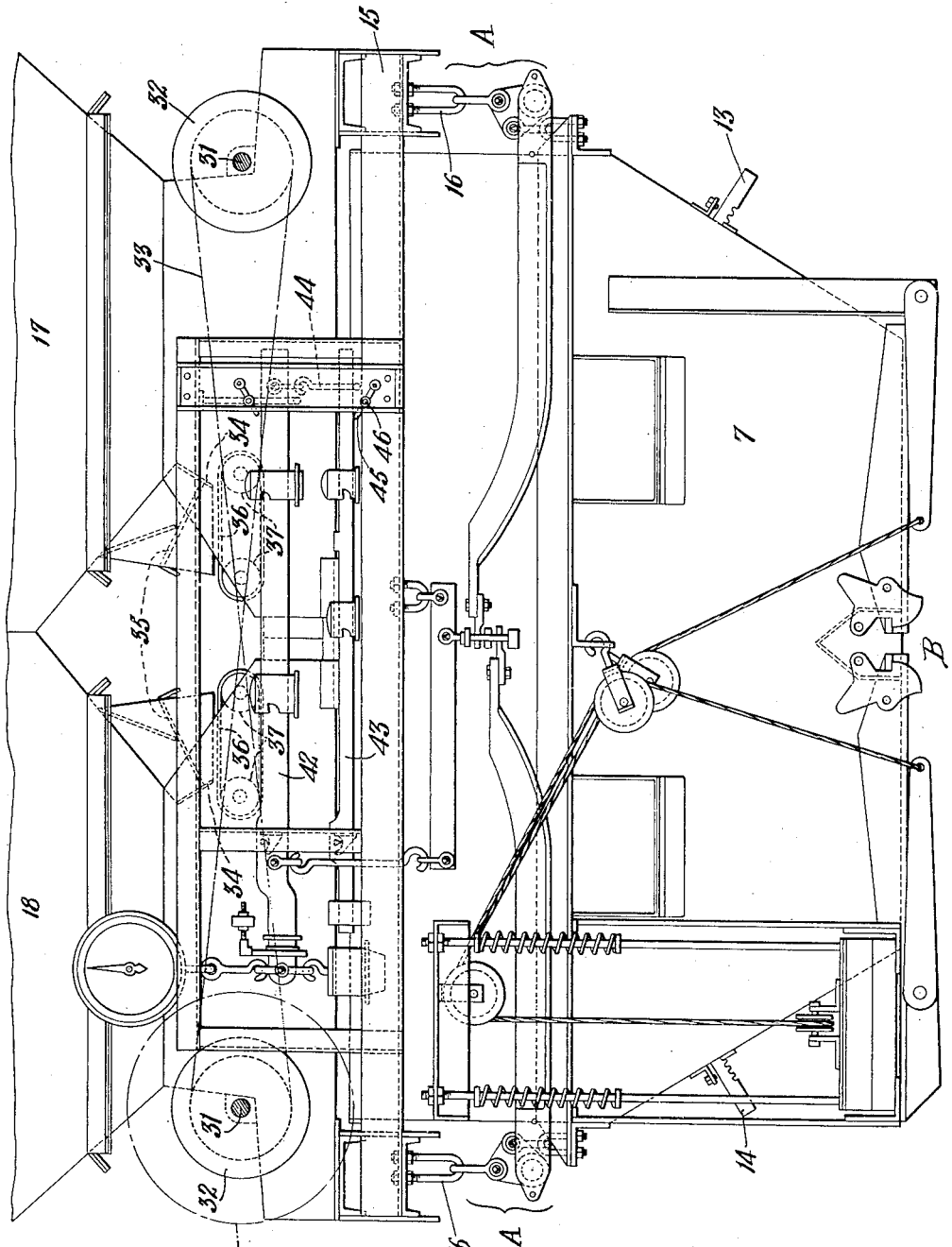

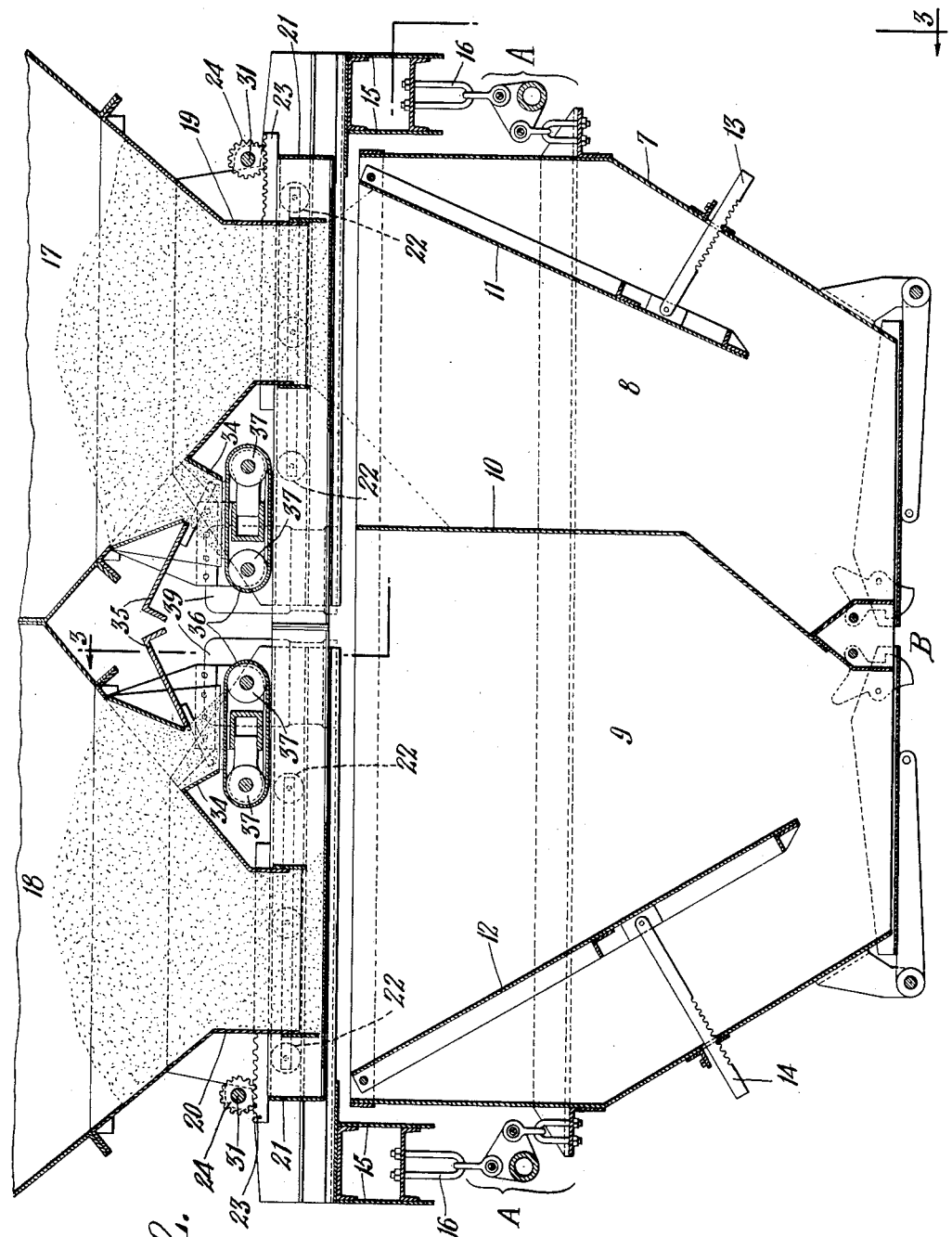

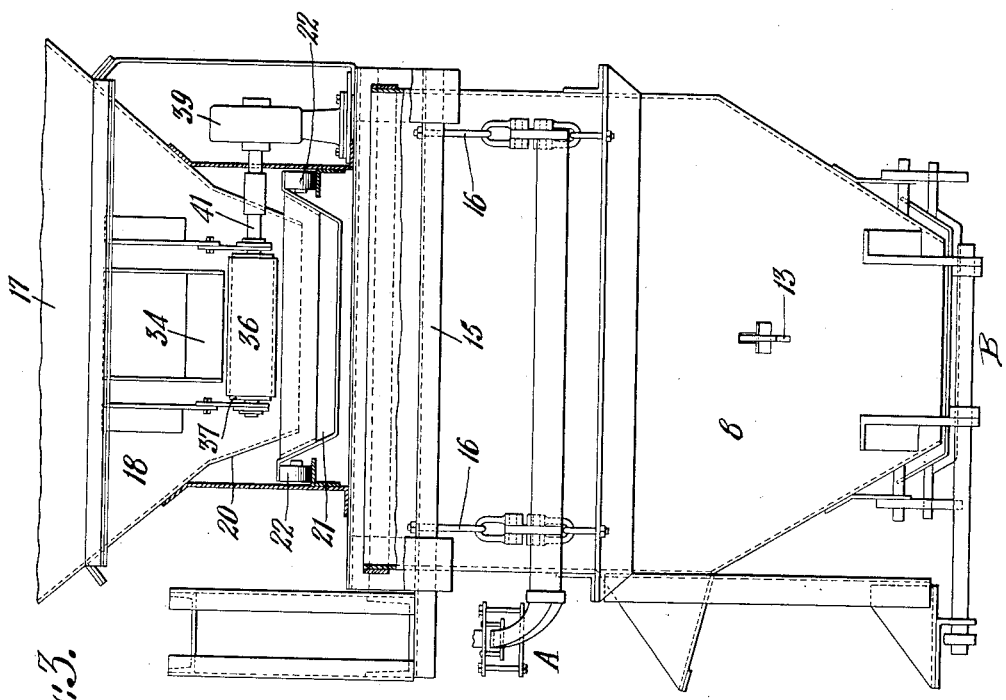
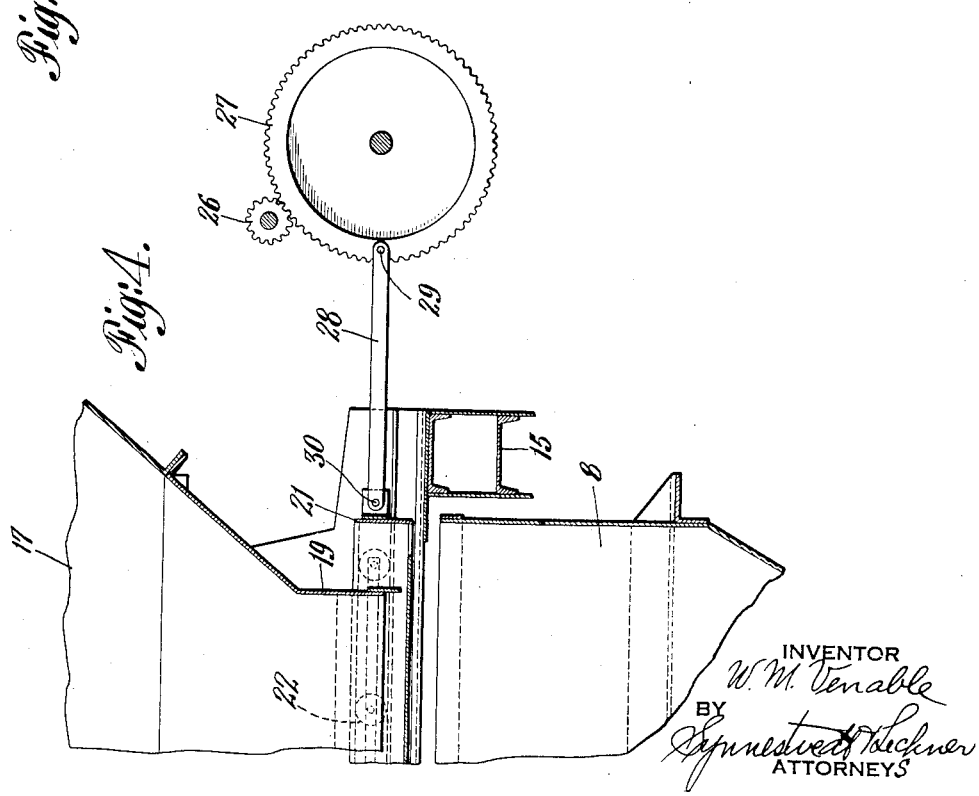

INVENTOR
W. M. Venable
BY
ATTORNEYS

Patented Nov. 27, 1934

1,982,127

UNITED STATES PATENT OFFICE 1,982,127

APPARATUS FOR MEASURING BULK MATERIALS

William Mayo Venable, Pittsburgh, Pa., assignor to Blaw-Knox Company, Pittsburgh, Pa., a corporation of New Jersey Application November 27, 1931, Serial No. 577,447

3 Claims. (Cl. 249—15)

This invention relates to improved apparatus for measuring what is commonly referred to as bulk materials and is particularly useful for use in connection with the weighing out of batches of sand and other ingredients for making concrete.

Before specifically pointing out the objects and advantages of the present invention it will be helpful to consider briefly the problems which must be overcome in satisfactorily apportioning the materials for batches of concrete as well as to consider, in a general way, the methods at present in use for meeting such problems.

As is well known in the art, if uniform and satisfactory concrete is to be produced, it is necessary to apportion with considerable accuracy the various ingredients which enter into each batch. Furthermore, if the work is to be done economically it is important that the necessary apportioning shall be done rapidly and with apparatus which is not unduly complicated or expensive.

In recent developments in this art it has become quite general to apportion the various ingredients entering into a batch of concrete by weight rather than by volume in spite of the fact that, as heretofore practiced, there are some objectionable features incident to this procedure. However, when several varieties or degrees of fineness of stone are used, the proportions of which may vary from time to time in accordance with the demands of the work or the desires of the engineers, the measuring of the ingredients by weight instead of by volume possesses material advantages in the ready control of the mix, and with these advantages in mind it is the purpose of my invention to provide an improved apparatus for readily and economically making possible the attainment of such advantages as will appear more fully below.

Where several grades of material are to be apportioned by separately determining the weight of each there are, in general, two possible modes of procedure, i. e., either to use a separate weighing scale to measure each ingredient or to use one scale to weigh the several kinds of material in succession, introducing them into the scales hopper one after the other. If the first procedure is adopted it is clear that there must be as many scales as there are ingredients, which, in the case of concrete (leaving the water out of account) means at least three scales if cement, sand and only one grade of stone are to be employed. However, this procedure may involve as many as six or more scales if several grades of stone are used—a practice which is now common in the art. Where a plurality of separate scales are used the various units may be operated in succession if one operator has to give attention to each scale, or they may be operated at the same time in case there are as many operators as there are scales, or in case the weighing is conducted automatically without operators to watch the several scale beams.

The second of the two methods above mentioned while requiring much less expensive equipment, is, as ordinarily carried out, entirely too slow to be feasible or economical, especially where a plurality of kinds of material have to be included in each batch.

With the foregoing in mind the primary objects of my invention will be better understood and these are as follows:—

First the speeding up of the second method of procedure above discussed so as to enable a single scales equipment to take care of measuring a number of ingredients in sufficiently rapid succession to supply one or even two concrete mixers on the time schedules suitable for mixing and thus to avoid unnecessary increase of investment in batching equipment.

In connection with the object just specified it should be borne in mind that customary specifications usually require that, for small mixers, the material be kept in the mixer from a minute and a half to two minutes after all the material entering the mix has been put into the mixer and, for large mixers, the time specified varies from two minutes to four minutes, according to the size of the mixer. It will, therefore, be seen that if it is desired to charge a small mixer with a single scales equipment, it is necessary to weigh out all of the materials which enter the batch in considerably less than two minutes and preferably approximately in one minute. With large mixers slightly more time is permitted in which to carry out the weighing operations, but, of course, the volumes involved are greater. Furthermore, where large mixers are being employed it may be highly desirable to charge two mixers with the same measuring apparatus, in which event it would be necessary to measure out two complete batches in less than three minutes. This object of my invention, therefore, has in mind a speeding up of the weighing process where a single scales equipment is in use to an extent sufficient to make possible time schedules such, for example, as mentioned above.

Another important object of my invention is to increase the accuracy of measurement with equipment of this kind without interfering with the speed.

A further object is to provide for quick and easy changes in the proportions of the various materials at the discretion of the engineer in charge.

Still another object is to provide, in equipment of this kind, certain automatic features which will aid in the attainment of the desired results.

In connection with all of the objects of the present disclosure one of the essential features of the invention is the provision of two distinct feeding mechanisms, the first of which is not subject to speed control and is very rapid and the second of which is comparatively much slower and of substantially uniform character, the major portion of each ingredient entering into the batch being measured by means of the first feeding mechanism and the final and smaller portion by means of the second mechanism, which second mechanism is preferably placed under the automatic control of the scales.

How all of the foregoing objects, as well as any others which are incident to my invention or which may appear hereinafter, are attained will appear more clearly in connection with the following description of the accompanying drawings which illustrate in preferred form the novel equipment which I have developed. In these drawings—

Figure 1 is a side elevation of a measuring equipment of the character described which embodies the improvements of the present invention.

Figure 2 is a vertical longitudinal section through the equipment shown in Figure 1.

Figure 3 is a section on the line 3—3 of Fig. 2.

Figure 4 is a partial vertical section taken similarly to Figure 2 but illustrating a means for automatically actuating a gate means which is used between the supply bin and the measuring receptacle.

Figure 5:
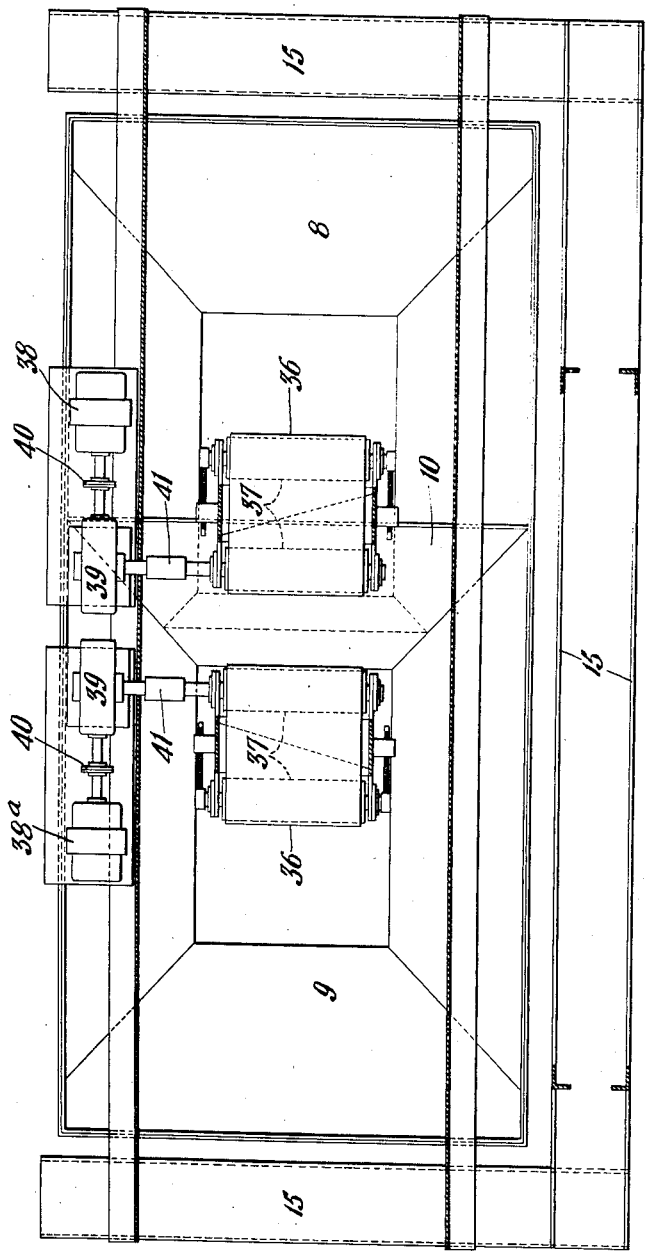
Figure 5 is a plan view of the structure shown in Figure 2 with the supply bins shown in section.

By referring to the drawings it will be seen that I have mounted the measuring receptacle 7 upon suitable beam scales mechanism indicated as a whole by the character A. In this instance the measuring receptacle is divided into two compartments, 8 and 9, by means of a partition 10. The volumetric capacity of the compartments 8 and 9 may be regulated by the pivoted baffle plates 11 and 12, adjustment of which is effected by means of the ratchet rods 13 and 14 which project through suitable openings in the walls of the receptacle 7. The baffle arrangement shown in the figures is similar to that shown and claimed in my Patent No. 1,663,574, dated March 27, 1928.

At the bottom the measuring hopper is provided with any suitable type of closure mechanism indicated as a whole by the character B, the details of which will not be described as they form no part of the present invention. Suffice it to say that when the necessary ingredients have been measured into the receptacle 7 the closure means B may be opened to discharge the contents.

The equipment is supported by suitable structure which includes the framework 15 to which the scales equipment is attached by means of the U-bolts 16.

As will now appear, the accompanying drawings illustrate equipment suitable for weighing out only two different kinds of material, it being understood, of course, that the same principles can be utilized in equipment designed to handle a considerably greater number of materials. This has been done for the sake of simplicity in illustration and description, but it should be clearly understood that more materials may be taken care of by mere duplication of parts.

Let it be assumed that the equipment illustrated is to be used for measuring sand and one type of stone or gravel. Above the measuring receptacle 7 are two supply bins 17 and 18, the first containing, for example, sand and the second gravel. The outlet neck or opening 19 of the bin 17 is of comparatively large capacity or size and is arranged to discharge into the compartment 8 of the measuring receptacle 7, while the corresponding outlet 20 of the bin 18 is arranged to discharge into the compartment 9. Each of the outlets 19 and 20 is provided with a suitable gate. Any type of gate commonly used for material bins may be employed. For convenience in illustrating the invention I show a trough-shaped gate mechanism 21 mounted for horizontal movement across the opening upon rollers 22 (see particularly Figure 3). This type of gate mechanism and the manner in which it functions is fully disclosed and claimed in the Garlinghouse and Venable Patent No. 1,571,544 to which reference can be had if so desired. Since this gate mechanism per se does not form a part of the present invention it will be sufficient to point out that it is arranged between the supply bin and the measuring receptacle so as to leave a free space between the gate and the bottom of the discharge opening and between the gate and the top of the measuring receptacle.

When the gate is in its open position, i. e., when there is an open passage between the bottom of the supply bin and the top of the measuring hopper, the material from the supply bin flows down by gravity absolutely freely and unrestrained and at a very rapid rate so that the corresponding chamber of the measuring receptacle can be substantially filled within a very few seconds, the flow from the bin to the receptacle ceasing with the material assuming its natural slope from the mouth of the outlet 19 to the sides of the measuring receptacle. The gate 21 is then closed.

The gates 21 may be moved either by hand through the ratchet rod 23, the pinion 24 and the hand wheel 25, or, mechanically and automatically, by means of the driving pinion 26, crank gear 27 and connecting rod 28, the latter being pivoted to the crank gear 27 at 29 and to the gate 21 at 30.

If the hand mechanism is used the shafts 31 upon which the pinions 24 are mounted may be suitably connected so that either gate 21 may be operated from the hand wheel 25 by means of suitable pulleys or gears 32 around which passes an operating cable or chain or similar device 33.

If the gates 21 are to be mechanically and automatically operated a suitable motor may be provided for revolving the driving pinion 26 at a speed which will rotate the gear 27 at a rate which is just sufficient to properly open and close the gate 21 within the time limits demanded by the particular work in hand. In other words, the pin 29 on the wheel 27 can be made to rotate from the position indicated in Figure 4 to the diametrically opposite position where the gate 21 will be open, and from there back to the position shown within say, for example, four or five seconds or whatever time may be desirable.

In my Patent No. 1,663,574 I have indicated how, when the apparatus as thus far described is operated manually, a receptacle may first be filled to certain natural slopes by opening and closing a gate 21 once, and subsequently additional material may be crowded in by working the gate back and forth. The parts now to be described serve the function of this additional feed, but are independent of the gate action and easily subject to automatic control.

Each of the supply bins is provided with a supplemental or auxiliary outlet neck 34 which can be completely closed, if desired, by means of the sliding gates 35 which are shown in open position in Figure 2. Below the outlet necks 34 I provide suitable feeding mechanism for positively and controllably withdrawing material from the bin and discharging it into the measuring receptacle. This mechanism, in the present instance, takes the form of an endless belt conveyor 36 mounted upon rollers 37 and driven by suitable motors 38 and 38a, one for each conveyor, connection to the conveyors being made through the reduction gearing 39 and shafting 40 and 41 as shown probably to best advantage in Figure 5.

With the sliding gates 35 in their normal or open position, the material in each bin is free to flow down under the influence of gravity through the outlet neck 34 on to the conveyor belt 36. Here it comes to rest with the material assuming its natural slope line, unless the conveyor is moving, whereupon the material will be carried and fed over one end into the measuring receptacle below. It is not important into which compartment of the measuring receptacle the material may fall, as it forms a comparatively small portion of the total batch and can be included in the measured weight regardless of the compartment into which it is delivered. It is, of course, convenient and logical to arrange so that the conveyor for the bin 17 rotates in a clockwise direction and discharges over the right hand end into the compartment 8 and the conveyor for the bin 18 in a counter-clockwise direction so that it discharges over the left hand end into the compartment 9. This, however, is not essential. But it is essential that the feed be stopped when exactly the correct weight of each material has been fed into the container. This can be done by an operator shutting off the current and thus stopping the motor which drives the conveyor, or it can be done by having the switch which controls the motor opened automatically by the rising of a scale beam, or by a contact on a dial.

The scales equipment associated with the measuring receptacle 7 is provided with two scale beams 42 and 43 (see particularly Figures 1 and 6), the upper beam 42 being arranged to weigh the first material introduced, in this instance let us assume sand from the bin 17, and the beam 43 for the second material, in this instance the stone from bin 18. When both beams are in action at the same time, the total weight of sand and stone is balanced by the two beams, which are then connected together by the link 44. During the time that a reading is to be obtained from the upper beam 42 the lower beam 43 is held in its upper position shown in Figure 6 by means of the usual keeper 45 pivoted therebelow at 46. In the position shown in Figure 6 the lever 43 does not contact with the link 44 so that the upper beam 42 is free to give its independent reading in a manner well understood in this art.

Figure 6:
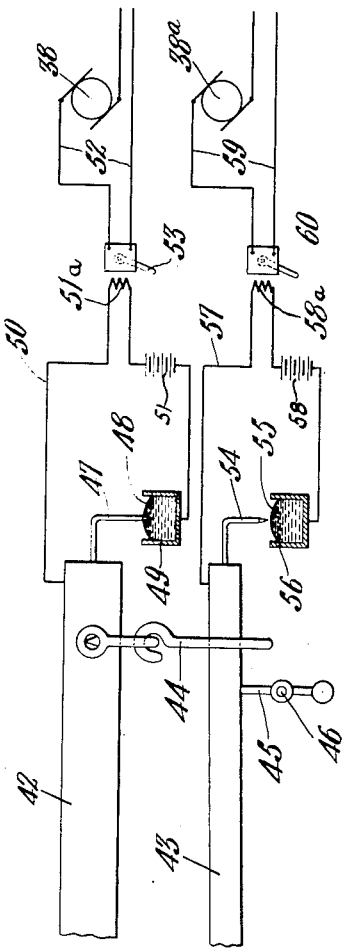
Figure 6 is a diagram showing the ends of the scale beams used in connection with the measuring receptacle with certain automatic electrical control equipment applied thereto.

To shut off the conveyor which feeds material from bin 17 when the scale beam 42 rises I have shown in Fig. 6 a simple mercury contact switch and indicated other switches diagrammatically, all principally for ease in illustration and description, it being my intention to use in this connection the best automatic electric devices commercially available, the automatic switches not being claimed per se in this invention, belonging to a distinct and elaborate art. As shown in Fig. 6 the free end of the beam 42 is provided with a wire contact point 47 which dips into the mercury 48 in the mercury cup 49 when the beam 42 is in its lower position. This completes an auxiliary circuit 50 connecting the battery 51 or other suitable source of current supply with a control coil 51a associated with the starting switch 53 of the motor 38. As long as 47 and 48 are in contact, switch 53 cannot open, but switch 53, which is closed by hand to start motor 38, opens automatically when contact between 47 and 48 is broken. The beam 43 also actuates an auxiliary circuit consisting of the parts 54, 55, 56, 57, 58, 58a and 60, which control the stopping of motor 38a, as the parts 47, 48, 49, 50, 51, 51a and 53 control the stopping of motor 38.

The operation of the device has been touched upon as the description has progressed, but for the sake of convenience it will be summarized as follows:

If the operation is to be semi-automatic, that is, controlled in part by the rising of the scale beams and in part by the operator, before attempting to measure out a batch, the operator first adjusts the baffle plates 11 and 12, so that the volume of material which will flow in by gravity from bins 17 and 18 will in each instance be somewhat less in weight than the desired amount. He sees that all motor switches are open. He also sees that the hopper of the scales is empty, and the scales in proper adjustment. Then he sets the poises on beams 42 and 43 for the required weights. Both beams will then be down, and the mercury contacts closed (or equivalent devices in correct position). He then raises the lower beam by the keeper 45, and is ready to begin to weigh out a batch.

To weigh out a batch the operator may first operate the sand gate 21. This may be done either manually or mechanically as previously indicated. If mechanically I prefer to provide a suitable motor and control switch for the driving pinion 26. This is not shown, but the mechanism required can take any form desired familiar to those skilled in the art. When the sand gate is opened the material from the bin 17 will flow into the receptacle 7, the compartment 8 being filled in a comparatively short period of time, the whole operation of opening the gate, filling the compartment, and closing the gate requiring but a few seconds. When this portion of the filling operation is completed the operator closes the switch which starts the conveyor 36 for the sand compartment. The conveyor will then feed in additional sand at a slower rate. This switch, 53 in Fig. 6, is automatically opened, electrically, when the contact in the mercury switch associated with beam 32 is broken. The operator then throws over the keeper for beam 43, causing both beams to lower and establish contact in the mercury cups. This alone does not start any motor because all motor switches are open. Thereafter, the operations for weighing out the stone or gravel from bin 18 are just the same as those described for the sand so that repetition will be unnecessary.

From the foregoing it is evident that when the complete batch has been measured, all of the switches are open. The batch is discharged when desired by opening the bottom doors. The only step required of the operator in preparation for weighing another batch of the same quantities is to throw over the keeper raising beam 43.

It will be perfectly apparent that many more types of material could be weighed out with similar equipment by simply duplicating the parts. The measuring receptacle 7 could be divided into three or more compartments and suitable corresponding supplies of raw materials can be provided in an equivalent number of bins located thereabove, each bin being equipped with similar controlling equipment. The scales can be provided with more than two beams working successively as herein described, or independently as may be convenient or desirable, in accordance with well known weighing principles.

Equipment such as shown and described will give extremely accurate measurement of the ingredients and can be very rapidly operated within the time schedules demanded under modern conditions of construction work, and a minimum number of men are required in order to do the necessary batching. In this way I am enabled to save not only a large amount of money in expensive equipment, but also a substantial degree of upkeep and labor cost.

My equipment avoids most of the difficulties previously encountered in devices of this kind. I utilize an exceedingly rapid method of gate feed for the larger part of the charge, perhaps as much as ninety-five percent of the total, and a slow secondary feed for only a relatively small proportion of each ingredient, and the conveyor or positive feeding means associated with the slow feed can be designed so as to operate extremely accurately whereas a large type of conveyor, such as has been proposed in a number of instances prior to my invention, cannot be made to give the accuracy in results because of the necessity for first running it at a high speed in order to measure out the larger percentage of the batch and then changing its speed and running it more slowly in order to complete the measurement of each ingredient.

It will thus be seen that my dual feeding mechanism for each ingredient, as it may be referred to, enables me to get a very accurate batch of any desired total weight in an extremely short time, for example, four or five seconds for ninety-five percent of the charge and five to ten seconds for the remainder.

I claim:

1. In apparatus for measuring a plurality of kinds of bulk materials, the combination of a measuring receptacle mounted on scales, means dividing said receptacle into a plurality of measuring compartments, a material supply bin or hopper above each compartment having means for freely discharging material by gravity into the compartment above which it is located, said discharge serving to substantially but not quite fully fill the compartment to its volumetric capacity, gate means for intercepting said feed, a supplementary discharge opening in each bin, a conveyor adjacent each supplementary discharge opening for controlling the flow of material therefrom, and means for operating each conveyor to withdraw material comparatively slowly from its respective supply bin and deliver it to the measuring receptacle until the total weight of material desired has been measured into said receptacle.

2. In apparatus for measuring a plurality of kinds of bulk materials, the combination of a measuring receptacle mounted on scales, means dividing said receptacle into a plurality of measuring compartments, a material supply bin or hopper above each compartment having means for freely discharging material by gravity into the compartment to its volumetric capacity, gate means for intercepting said feed, a supplementary discharge opening in each bin, and means for controllably withdrawing material through said supplemental discharge openings and delivering it to the measuring receptacle at a comparatively slow rate of speed until the total desired weight of material from each supply bin has been measured out.

3. In apparatus for measuring a plurality of kinds of bulk materials, the combination of a measuring receptacle mounted on scales, means dividing said receptacle into a plurality of measuring compartments, a material supply bin or hopper above each compartment having means for freely discharging material by gravity into the compartment above which it is located, said discharge serving to substantially but not quite fully fill the compartment to its volumetric capacity, gate means for intercepting said feed, a supplementary discharge opening in each bin, a conveyor adjacent each supplementary discharge opening for controlling the flow of material therefrom, and means for operating each conveyor to withdraw material comparatively slowly from its respective supply bin and deliver it to the measuring receptacle, together with means actuated by the scales for stopping said conveyors when the total weight of materials desired from each bin has been delivered into said receptacle.

WILLIAM MAYO VENABLE.